United States Patent [19]

Wilde

[11] Patent Number: 4,659,175
[45] Date of Patent: Apr. 21, 1987

[54] FIBER WAVEGUIDE COUPLING DEVICE

[75] Inventor: Peter V. D. Wilde, Bethlehem, Pa.

[73] Assignee: American Telephone and Telegrraph Company, AT&T Bell Laboratories, Murray Hill, N.J.

[21] Appl. No.: 647,654

[22] Filed: Sep. 6, 1984

[51] Int. Cl.⁴ .............................................. G02B 6/36
[52] U.S. Cl. ............................ 350/96.20; 350/96.10; 350/96.21
[58] Field of Search ................ 350/96.15, 96.20, 96.21

[56] References Cited

U.S. PATENT DOCUMENTS

| | | | |
|---|---|---|---|
| 4,217,032 | 8/1980 | Sheem | 350/96.21 |
| 4,428,644 | 1/1984 | Glass et al. | 350/96.14 |
| 4,432,601 | 2/1984 | Mannschke | 350/96.20 X |
| 4,452,506 | 6/1984 | Reeve et al. | 350/96.15 X |
| 4,474,423 | 10/1984 | Bisbee et al. | 350/96.20 X |

*Primary Examiner*—William L. Sikes
*Assistant Examiner*—Akm E. Ullah
*Attorney, Agent, or Firm*—Peter V. D. Wilde

[57] ABSTRACT

According to this invention, a coupler or coupling tool is proposed with active alignment of one fiber with respect to another in both planes of interest, i.e. the vertical position and the lateral position. A key feature of the alignment means is that as one position is adjusted slightly, the other position is automatically adjusted through full range. This is accomplished rapidly enough that it is simple to test all combinations of the two positions.

17 Claims, 10 Drawing Figures

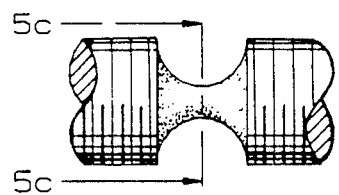
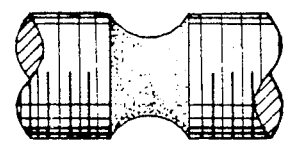
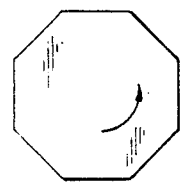
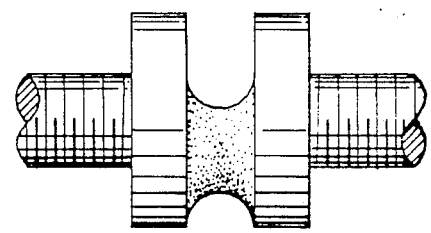
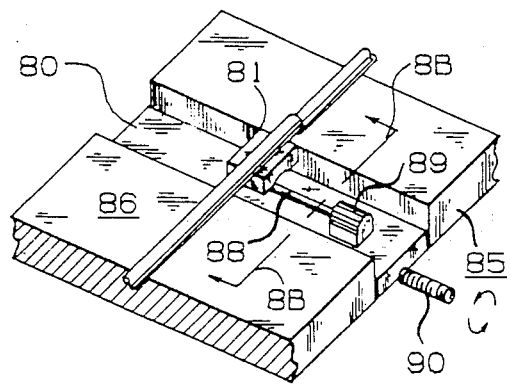
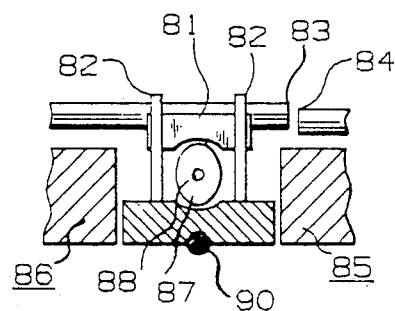

FIBER WAVEGUIDE COUPLING DEVICE

BACKGROUND OF THE INVENTION

Optical waveguide couplers require critical alignment between the fibers being coupled to avoid excessive loss of signal in the coupler. The alignment that is important is that between the cores of the respective fibers, not the exterior circumference of the fiber. If the fiber cladding is slightly off center, or the surface of the fiber is slightly damaged, alignment of the cores is difficult. Even with perfect fiber geometry, alignment of single mode fibers, in which the core diameter is typically of the order of 5 microns, is difficult.

A wide variety of fiber couplers and coupling tools have been proposed, some of which have built-in means for actively aligning the fibers while the connection or coupling is effected. One of these is described and claimed in U.S. Pat. No. 4,217,032 issued Aug. 12, 1980 to Sang K. Sheem. The device described by Sheem is provided with means for raising and lowering one fiber with respect to another as these fibers are retained in a grooved unitary support. A tapered alignment member is fitted into a groove extending perpendicular to one of the fibers and height of that fiber is adjusted by moving the tapered alignment member. While this scheme has been used successfully to adjust the alignment of fibers during coupling, it has the disadvantage of adjusting the fiber in only one of the two planes that are critical in positioning one fiber core with respect to another. The other important adjustment is the lateral position of the fiber. The third degree of freedom, i.e. the spacing between the fibers is slightly less critical than the vertical and lateral positions.

BRIEF STATEMENT OF THE INVENTION

According to this invention, a coupler or coupling tool is proposed with active alignment of one fiber with respect to another in both planes of interest, i.e. the vertical position and the lateral position. A key feature of the alignment means is that as one position is adjusted slightly, the other position is automatically adjusted through full range. This is accomplished rapidly enough that it is simple to test all combinations of the two positions.

BRIEF DESCRIPTION OF THE DRAWINGS

FIGS. 5A and 5B are schematic representations of an alternative construction for the adjusting element;

FIG. 5C is a sectional view through FIG. 5A as shown.

FIG. 6 is a sectional view similar to that of FIG. 5C.

FIG. 7 is an alternative arrangement to that of FIGS. 5A and 5B.

FIGS. 8A and 8B are views of an alignment apparatus designed for independent control of vertical and horizontal adjustments.

DETAILED DESCRIPTION

Figure 1:
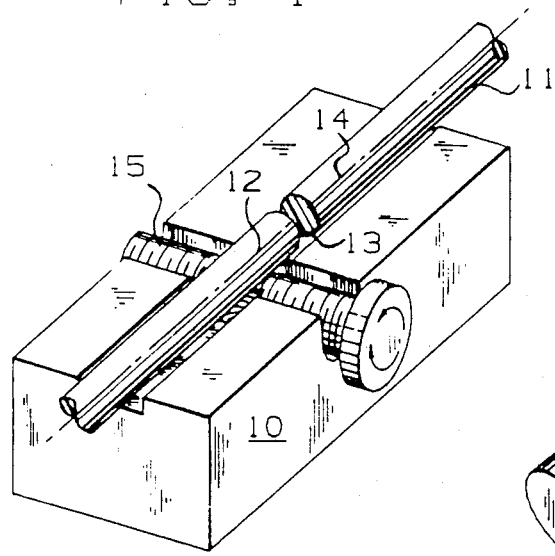
FIG. 1 is a perspective view of a coupler assembly constructed using the teachings of the invention.
Figure 2:
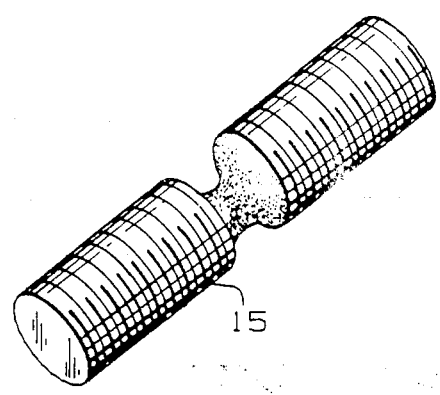
FIG. 2 is a perspective view showing in detail the adjustment element of the coupler of FIG. 1.

A coupler according to the invention is shown in FIG. 1. It should be understood that the term coupler as used here means a permanent coupling device, or a temporary coupling tool used to make a permanent coupler. A support base 10 is shown with a first fiber section 11 in fixed position on the base. The device is designed to align the core 12 of fiber 13 to the core 14 of fiber 11. For simplicity these fibers have only a core section and a surrounding section. The fiber may be a single mode fiber, with a small core, or a multimode fiber with a relatively larger core. The material surrounding the core may be cladding material alone, or may include a coating material as well. It may also include a sheath fixed to the ends of the fiber for the purpose of coupling or splicing. Whatever form the outer surface of the fiber takes, that surface is designed to rest in the indented portion of the alignment element. As mentioned the fiber section 11 is relatively fixed, while the fiber section 13 is free to move both laterally and up and down. A clamp means (not shown) is conveniently provided for fixing fiber section 13 in place either temporarily, while the coupling or splice is being effected, or permanently. The fiber sections may be joined permanently by a variety of techniques known in the art, e.g. fusion splicing, adhesive splicing, or mechanical splicing. The invention resides in the means for adjusting the fiber prior to coupling, and is practically implicit from an examination of FIGS. 3-5. The adjusting member 15, illustrated in FIG. 2, is shown here as a screw, but in general is an elongated member having means for translating it in a direction lateral with respect to the support means 10 and the end of fiber section 11. Adjustment means 15 is grooved as shown to accommodate the fiber section 13. The groove is shown extending into the elongated member 15, in this case a screw with a portion of reduced diameter as shown more clearly in FIGS. 3A and 3B. It should be apparent that the grooved section of the adjusting member could be larger than the remainder of the screw, or the groove can be deeper than that shown. This consideration is important in determining the extent of upward-downward excursion of the fiber as will later be described.

Figure 3A:
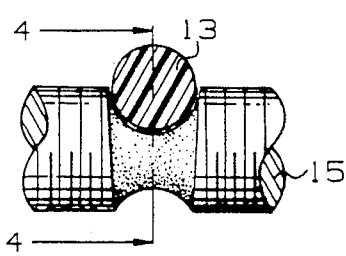
FIG. 3A is a schematic view of the adjustment element of FIG. 2 and the fiber being coupled in a first position of rotation of the element.
Figure 3B:
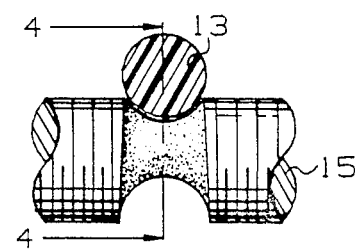
FIG. 3B is a schematic view similar to that of FIG. 3A showing the adjusting element in a second position of rotation.

Referring to FIGS. 3A and 3B it will be evident that the groove, according to one aspect of the invention, is of varying depth around the periphery of the adjustment member. As the adjustment member is turned, conveniently at the same time the lateral adjustment is effected, the fiber will move up and down by a distance determined by the difference in depth of the grooves shown at the top and bottom of FIG. 3A (or 3B). Advantageously, that distance is made to correspond to the maximum vertical adjustment contemplated for fiber section 13. The amount of excursion in the lateral dimension with each turn of the adjusting element 15 is made to be a relatively small fraction of the total adjustment expected for fiber section 13. The result of turning the adjusting element 15 therefore is a fine adjustment of the fiber section in one direction, coupled with a large adjustment in the other (these could be reversed). Therefore, each fine lateral adjustment is combined instantly with the full range of vertical adjustments. If desired, the adjustment element can be duplicated in a direction perpendicular to element 15, i.e. threaded through the thickness of the support means 10, and used to achieve these same results in the other plane. Alternatively, a single adjustment means can be nearly as effectively made that way, i.e. to extend in the vertical dimension.

Figure 4:
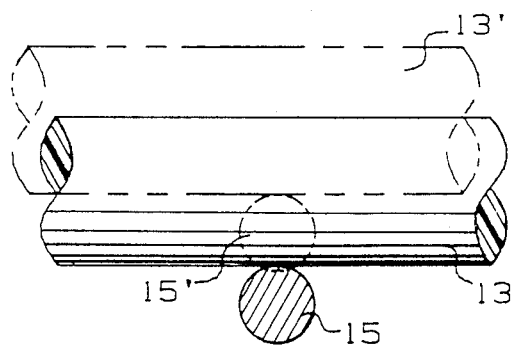
FIG. 4 is a view in section through FIG. 3A with a section of FIG. 3B shown in phantom.

A sectional view of element 15 in FIG. 3A is shown in FIG. 4 with the corresponding position of fiber 13 as shown. After a partial rotation, typically but not necessarily 180 degrees, the element 15 appears as in FIG. 3B and the corresponding cross section is shown in phantom in FIG. 4 with the adjusting element denoted 15' and the fiber denoted 13'. As indicated before the amount of vertical adjustment available for fiber 13 corresponds to the difference in the depth of the grooves in FIGS. 3A and 3B. Also as indicated before the angle of rotation to achieve the full range of vertical excursion need not be 180 degrees. An alternative embodiment where this angle is 90 degrees is suggested in FIGS. 5A and 5B. Here, the cross section, shown in FIG. 5C is elliptical. Other alternatives will occur to those skilled in the art.

The number of excursions per rotation can be increased still further by adding more facets to the alignment member as shown schematically in FIG. 6. By selecting the pitch of the screw driving the alignment member, and the number of facets on the grooved portion of the member, i.e. the number of complete vertical excursions per rotation, the ratio of vertical motion to horizontal motion can be varied as desired. The two way adjustment can be made more rapidly when that ratio is relatively small, but more accurately when that ratio is large. It is may be desirable therefore to construct a tool with two drives, one for gross alignment and a separate alignment element for fine adjustment. The device described above can obviously be modified in many ways to add features, but at the cost of added complexity as well.

Although the invention so far described, and the specific embodiment involve coupling of one fiber section to another, a nearly identical alignment situation is presented when it is necessary to install a fiber waveguide in proximity to a light source, typically a laser or LED, or a light detector. Here it is also important to align the fiber within the two degrees of freedom discussed above. The apparatus described by FIG. 1 is suitable for this application as well, although in that case the fiber section 11 would be replaced by a laser or light emitting diode, or a diode detector.

As indicated before the vertical excursion of the adjustment with the device shown in FIG. 1 is determined by the difference in depth of the shallow and deep groove. As such it is limited by the diameter of the adjustment element. The diameter can be increased to provide greater flexibility in this dimension, as shown schematically in FIG. 7. It is also evident that the grooves may be made deeper than those shown in FIGS. 3A and 3B to give more positive lateral positioning of the fiber.

A similar alignment problem is also encountered in coupling a fiber waveguide to an integrated optic-waveguide, the latter typically in the form of a crystal or glass plate with surface or buried channel waveguides formed in the plate. It is necessary to precisely position the end of the fiber waveguide to the entrance of the waveguide in the plate.

The alignment device described above incorporates the means for vertical and lateral translation in a single alignment element. That construction has convenience and simplicity. Alternatively one may choose to separate these functions and provide independent means, as alluded to earlier, for controlling the motion in the two orthogonal axes. A variety of implementations will occur to those skilled in the art. An exemplary one is shown in FIGS. 8A and 8B. In the apparatus of FIG. 8A, a table 80 is provided for supporting the fiber support or guiding means 81. The guiding means, shown in better detail in FIG. 8B, is slidably mounted in supports 82 so it is free to move vertically with respect to the table 80. The fiber end which is being adjusted is shown at 83, and the fiber end that is stationary, to which end 83 is being aligned, is shown at 84. The fiber end 84 is supported by support section 85 and the remaining part of the fiber section terminating in end 83 is supported by table section 86. As just described, the apparatus can be used as well to align a fiber section to a laser or LED or the like in which case fiber end section 84 would be replaced with the diode or like device. One can alternatively choose to move the diode device with respect to the fiber end in which case the fiber end section and the diode means would simply be interchanged in this apparatus or the one described earlier. Referring again to FIG. 8A, the fiber guide means is adapted to be driven reciprocally in the vertical direction as shown by cam 87. The cam, in turn, is rotated via shaft 88 by servo motor 89. The cam may be shaped like FIG. 6 to increase the vertical periodicity per rotation. Lateral motion is imparted to the fiber end by movement of the table section 80 controlled by screw or worm gear 90. One advantage of this arrangement is that the relative movement vertically and lateral may be independently controlled. Thus for example, rotation of means 87 may be established at a relatively high rate to find the optimum lateral position (by the automatic monitor described earlier). Then the vertical movement may be adjusted relatively slowly to find the optimum vertical position. Obviously, these can be reversed if desired. By scanning along one axis rapidly, and the other slowly, essentially all possible combinations of orthogonal positions can be measured in an optimum time period. The arrangement described has the further advantage that the optimum position of one of the axes is located controllably. After that location is found the other axis can be adjusted for optimum position.

Various additional modifications and extensions of this invention will become apparent to those skilled in the art. All such variations and deviations which basically rely on the teachings through which this invention has advanced the art are properly considered to be within the spirit and scope of this invention.

What is claimed is:

1. Method for alignment of the core of a fiber waveguide to a mating optical element, said fiber waveguide having a core section and one or more cladding layers surrounding the core section, the method comprising the steps of:
   directing a beam of light through the core of the fiber waveguide,
   measuring the light output from said mating optical element, and
   adjusting the position of the fiber waveguide with respect to the optical element by moving one with respect to the other in two approximately orthogonal directions normal to the end of the fiber waveguide, said moving step comprising:
   moving in a first orthogonal direction at a first rate, moving in the second orthogonal direction at a second rate substantially greater than the first rate, detecting the maximum in the light output and stopping the moving when the light output is maximum, and permanently fixing the position of the fiber waveguide with respect to the optical element.

2. Method of claim 1 in which the optical element is a fiber waveguide.

3. Method of claim 1 in which the optical element is a diode light source.

4. Method of claim 1 in which the optical element is a light detector.

5. Method of claim 1 in which the second rate is at least five times the first rate.

6. Method of claim 1 in which the movement in said orthogonal directions is reciprocal and at least several back and forth movements in said second orthogonal direction are completed during a single back and forth movement in said first direction.

7. Method of claim 1 in which movement in the second orthogonal direction is reciprocal while movement in the first orthogonal direction is essentially continuous.

8. Method of claim 1 in which the movement in the second orthogonal direction is reciprocal and the extent of the excursion of the reciprocal movement corresponds to the full field of adjustment in the second direction.

9. Method of claim 8 in which the movement in the first direction is continuous and begins at one extreme of the full field of adjustment in that direction.

10. Method of claim 1 in which the movement in the first and second directions is controlled by a single adjusting element so that the said movement in the two directions is coupled.

11. Method of claim 1 in which the movement in the two directions is independently controlled so that the speed of movement in one direction can be controlled independently of the other.

12. The method of claim 1 in which the movement in the two directions is independently controlled and the extent of the movement in one direction is controlled independently of the extent of the movement in the other direction.

13. Method of claim 11 in which the movement in said second direction is set at a first rate while the optimum position in the first direction is measured, and including the additional step of reducing the rate of movement in the second direction to establish the optimum position in the first direction.

14. Device for autoaligning the end of a fiber waveguide said waveguide having a core extending along the axis of the fiber waveguide comprising:

single mechanical means for controllably moving the end of a fiber waveguide in reciprocal motion simultaneously in a first direction and a second direction approximately perpendicular thereto with both directions approximately perpendicular to the axis of the fiber, waveguide said means effecting movement in the first of said directions significantly faster than the movement in the second to create asymmetric biaxial displacement of the end of the fiber waveguide, means for introducing light into one end of the fiber waveguide means for measuring the light exiting the other end of the fiber waveguide and means for activating the mechanical means in response to the measuring means.

15. Method for aligning the end of a fiber waveguide to a mating optical element, said fiber waveguide having a core section and one or more cladding layers surrounding the core section, the method comprising the steps of:

directing a beam of light from the optical element toward said end of the fiber waveguide, measuring the light output from the core at a location away from the end, adjusting the relative position of (1) the end of the fiber waveguide with respect to (2) the optical element by moving (1) or (2) in two approximately orthogonal directions normal to the end of the fiber waveguide, said moving step further comprising:

moving in a first orthogonal direction at a first rate, moving in a second orthogonal direction at a second rate substantial greater than the first, said movement in the first direction at the first rate being substantially unidirectional.

said movement in the second direction at the second rate being reciprocal.

16. Method for aligning the end of a fiber waveguide to a mating optical element, said fiber waveguide having a core section extending along the axis of the fiber and one or more cladding layers surrounding the core section, the method comprising the steps of:

directing a beam of light through the core of the fiber waveguide, detecting the level of light incident on the optical element, adjusting the position of (1) the end of the fiber waveguide with respect to (2) the optical element by moving (1) with respect to (2) in a first direction normal to the axis of the fiber waveguide, and in a second direction normal to the axis of the fiber, said second direction being approximately normal to the first direction, the adjusting step further comprising:

determining the full range of movement in said first direction to achieve the desired adjustment, determining the full range of movement in said second direction, to achieve the desired adjustment, moving (1) with respect to (2) repeatedly back and forth in said first direction over said full range of movement while moving (1) with respect to (2) relatively slowly in said second direction.

detecting the maximum in the light incident on the optical element, and permanently fixing the position of the fiber waveguide with respect to the optical element.

17. Method for aligning the end of a fiber waveguide to a mating optical element, said fiber waveguide having a core section extending along the axis of the fiber and one or more cladding layers surrounding the core section, the method comprising the steps of:

directing a beam of light from the optical element toward the end of the fiber waveguide, sensing the light intensity in the core of the fiber waveguide.

* * * * *